(12) United States Patent
Loncteaux

(10) Patent No.: US 6,304,852 B1
(45) Date of Patent: Oct. 16, 2001

(54) METHOD OF COMMUNICATING COMPUTER OPERATION DURING A WAIT PERIOD

(75) Inventor: Peter C. Loncteaux, Boca Raton, FL (US)

(73) Assignee: Vignette Graphics, LLC, Boca Raton, FL (US)

(*) Notice: Subject to any disclaimer, the term of this patent is extended or adjusted under 35 U.S.C. 154(b) by 0 days.

(21) Appl. No.: 09/358,229

(22) Filed: Jul. 21, 1999

(51) Int. Cl.⁷ .............................. G06F 19/00; H04N 7/10
(52) U.S. Cl. ................... 705/14; 725/32; 725/36
(58) Field of Search ................ 705/1, 14; 725/32, 725/36

(56) References Cited

U.S. PATENT DOCUMENTS

| | | | |
|---|---|---|---|
| 5,305,195 | * 4/1994 | Murphy | 705/1 |
| 5,572,643 | * 11/1996 | Judson | 709/218 |
| 5,781,894 | 7/1998 | Petrecca et al. | 705/14 |
| 5,786,845 | * 7/1998 | Tsuria | 725/32 |
| 5,805,815 | 9/1998 | Hill | 395/200.48 |
| 5,805,974 | * 9/1998 | Hite et al. | 725/69 |
| 5,996,007 | 11/1999 | Klug et al. | 709/218 |
| 6,036,601 | 3/2000 | Heckel | 463/42 |
| 6,070,186 | * 5/2000 | Nishio | 725/92 |

FOREIGN PATENT DOCUMENTS

WO 93/21732 * 10/1993 (WO) ............... H04N/7/10

OTHER PUBLICATIONS

Lichty, Tom, "The Official America Online For Windows 3.1 Tour Guide, Third Edition", Ventana, p. 155, Jan. 1994.*
"Zing Network and PC World Technology Network Launch New Online Information Channels", PC World, Apr. 14, 1999.*
Justin Hubbard, "Web Suites Threaten Add–on Packages", Computerworld, Mar. 3, 1997, p. 6*
"Other useful features of Netscape", Computimes Malaysia, Nov. 2, 1998.*
Jaikumar Vijayan, "Web Tools updates help when traffic hits", Computerworld, Jul. 19, 1999, p. 14.*
Joe Peschel, "Lubricate your system with Oil Change", InfoWorld, Dec. 16, 1996, p. 93.*
Jeffrey M. O'Brien et al., "The New Push", MC Technology Marketing Intelligence, Aug. 1998, p. 12.*
Sam McMillan, "In the Blink of an Eye", Advertising Age's Creativity, Oct. 1998.*
Kate Maddox, "Push Start–up Capitalizes on Dead Download Time", Advertising Age, Jun. 15, 1998, p. 65.*

* cited by examiner

Primary Examiner—Eric W. Stamber
Assistant Examiner—James W. Myhre
(74) Attorney, Agent, or Firm—Bockhop & Reich, LLP; Bryan W. Bockhop

(57) ABSTRACT

In a method of displaying advertising and communicating computer operation during a wait period, a plurality of images is displayed during the wait period in a predetermined sequence as part of an animation that indicates that the wait period is proceeding. Advertising information is integrated with the plurality of images.

9 Claims, 6 Drawing Sheets

METHOD OF COMMUNICATING COMPUTER OPERATION DURING A WAIT PERIOD

BACKGROUND OF THE INVENTION

1. Field of the Invention

The present invention relates to computer displays and, more specifically, to a method of displaying an indication of computer operation during computer download wait periods.

2. Description of the Prior Art

Computer wait periods a increasingly common. Examples of such periods include the amount of time expended during a data download (such as a site access on the global computer network), storage access time and time expended by a computer during complex operations. During such wait periods, the user is often concerned that the computer is malfunctioning and that it is not actually performing any operations.

To alleviate the user's concern, many computers display an indication that the computer is currently executing an operation that requires a wait period. Such an indication may be something as simple as an iconic representation of an hour glass displayed on the user's computer screen. More complicated systems give the user an idea of the amount of time remaining in the wait period. For example, many computers display a blue bar that changes in length in proportion to the amount of the period that has already passed during a data download.

Other than an indication of the time remaining in the wait period, no useful information is conveyed by such systems. Therefore, during the wait periods represented by such systems, the user often stares blankly at the screen while waiting for the wait period to end. Given that the user is also a consumer, current systems do not make use of the valuable attention of the user that could otherwise be directed to advertising information.

Therefore, there is a need for a system that makes greater use of the user's attention during computer wait periods.

SUMMARY OF THE INVENTION

The disadvantages of the prior art are overcome by the present invention which, in one aspect, is a method of displaying advertising and communicating computer operation during a wait period. During a wait period, a plurality of images is displayed in a predetermined sequence as part of an animation that indicates that the wait period is proceeding. Advertising information is integrated with the plurality of images.

In another aspect of the invention, a period of time, having a beginning and an end, that is required to complete a wait period is determined. A plurality of images is displayed in a predetermined sequence during the wait period. The plurality of images includes a first image and a last image. The images are displayed as part of an animation that symbolically represents the amount of time remaining in the period of time at any given time during the wait period. The first image is displayed contemporaneously with the beginning of the period of time and the last image is displayed contemporaneously with the end of the period of time.

In yet another aspect of the invention, during the wait period, a plurality of sounds is output in a predetermined sequence during the wait period. The plurality of sounds includes a first sound and a last sound, and they are output as part of an audible message that symbolically represents the amount of time remaining in the period of time at any given time during the wait period. The first sound is output contemporaneously with the beginning of the period of time and the last sound is output contemporaneously with the end of the period of time. The plurality of sounds include advertising information.

These and other aspects of the invention will become apparent from the following description of the preferred embodiments taken in conjunction with the following drawings.

As would be obvious to one skilled in the art, many variations and modifications of the invention may be effected without departing from the spirit and scope of the novel concepts of the disclosure.

DETAILED DESCRIPTION OF THE INVENTION

Figure 1:
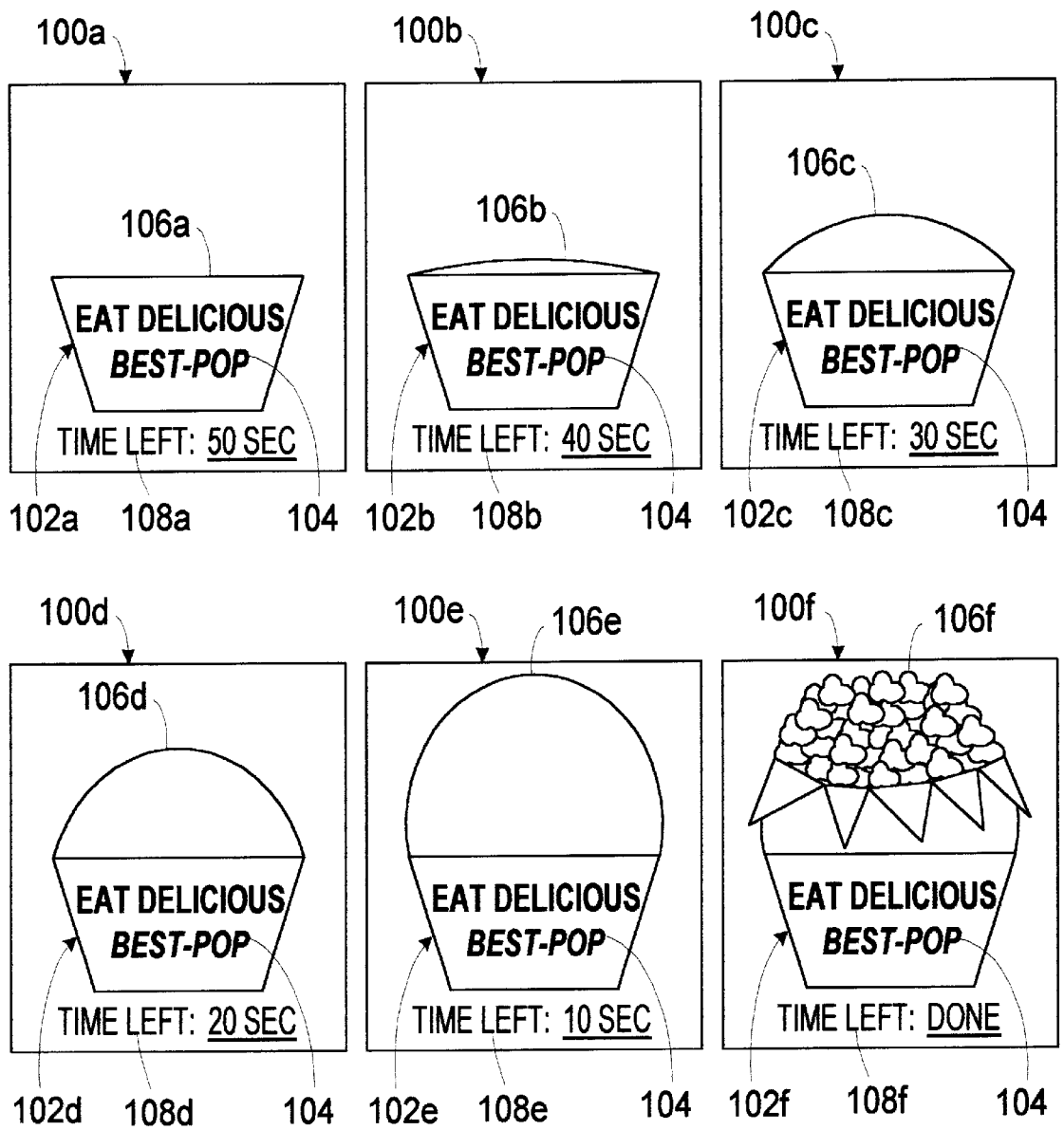
FIG. 1 is a schematic diagram showing a first example of a sequence of images in accordance with one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, a first example of a sequence of images 100a–f that form an animation that is displayed during a computer wait time includes a plurality of picture elements 102a–f that change over time. The picture element 102a of the first image 100a could symbolically represent an item (e.g., a image of a product being advertised) as it appears at the beginning of a process, with each successive representation of picture elements 102b–g representing a successive stage in the process until the end of the process, which would be represented by picture element 102f. For example, if the images 100a–f form an animation that represent the popping of pop corn, then the picture element could include a changing portion 106a–f that, in successive frames, represents an expanding pop corn container. The first image 100a would be displayed at the beginning of the wait period and the last image 100f would be displayed at the end of the wait period. The images 100a–f could also include text 108a–f that would indicate the amount of time remaining in the wait period. The picture elements 102a–f would also include advertising information, such as a product-related slogan 104, integrated therein.

Figure 2:
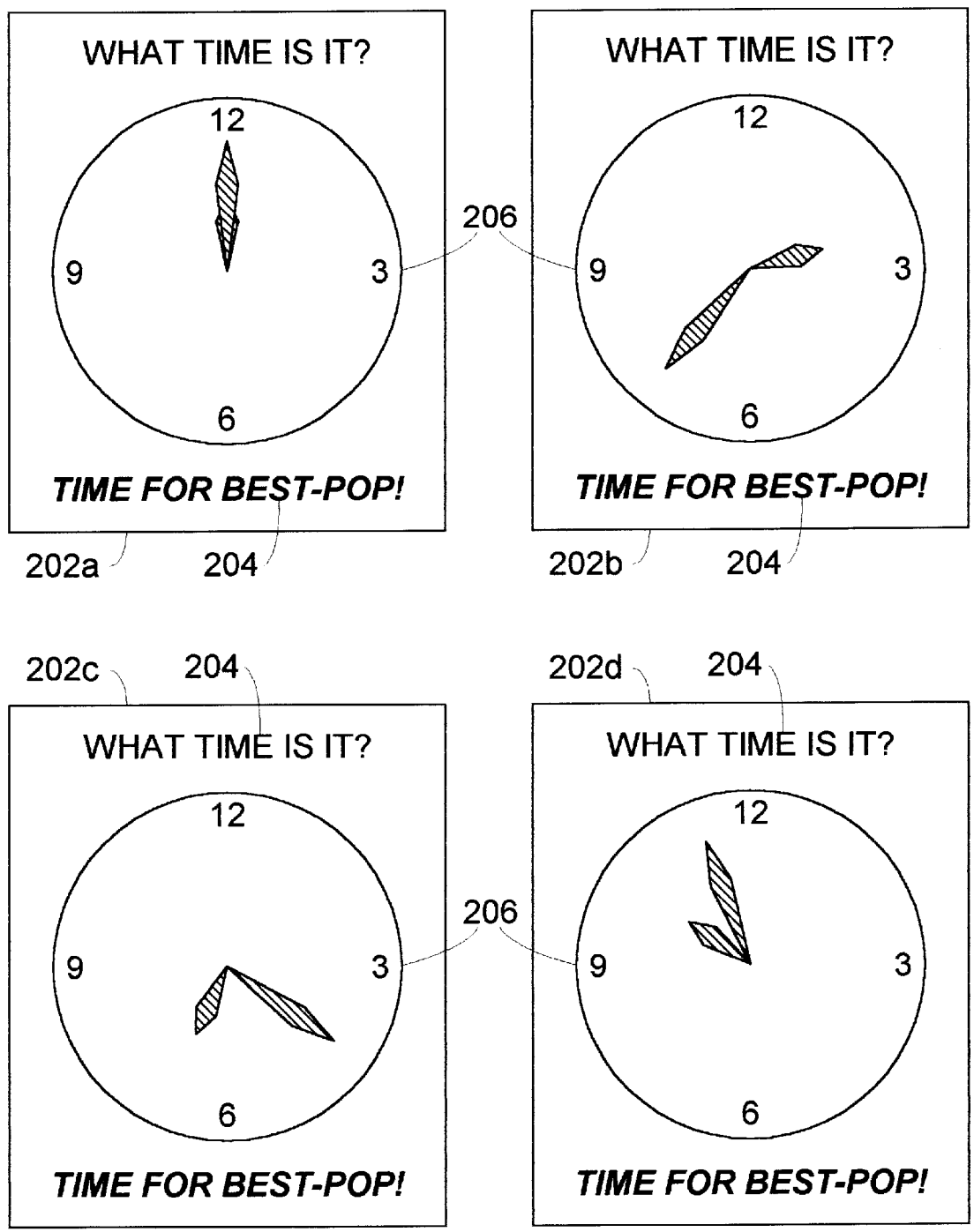
FIG. 2 is a schematic diagram showing a second example of a sequence of images.

As shown in FIG. 2, in a second example of a sequence of images 202a–d, the picture element 206 could a simple image, such as that of a clock wherein movement of the hands of the clock represent the passing of time. In this example, the advertising information 204 could be displayed in a part of the image 202a–d other than in the picture element 206.

Figure 3:
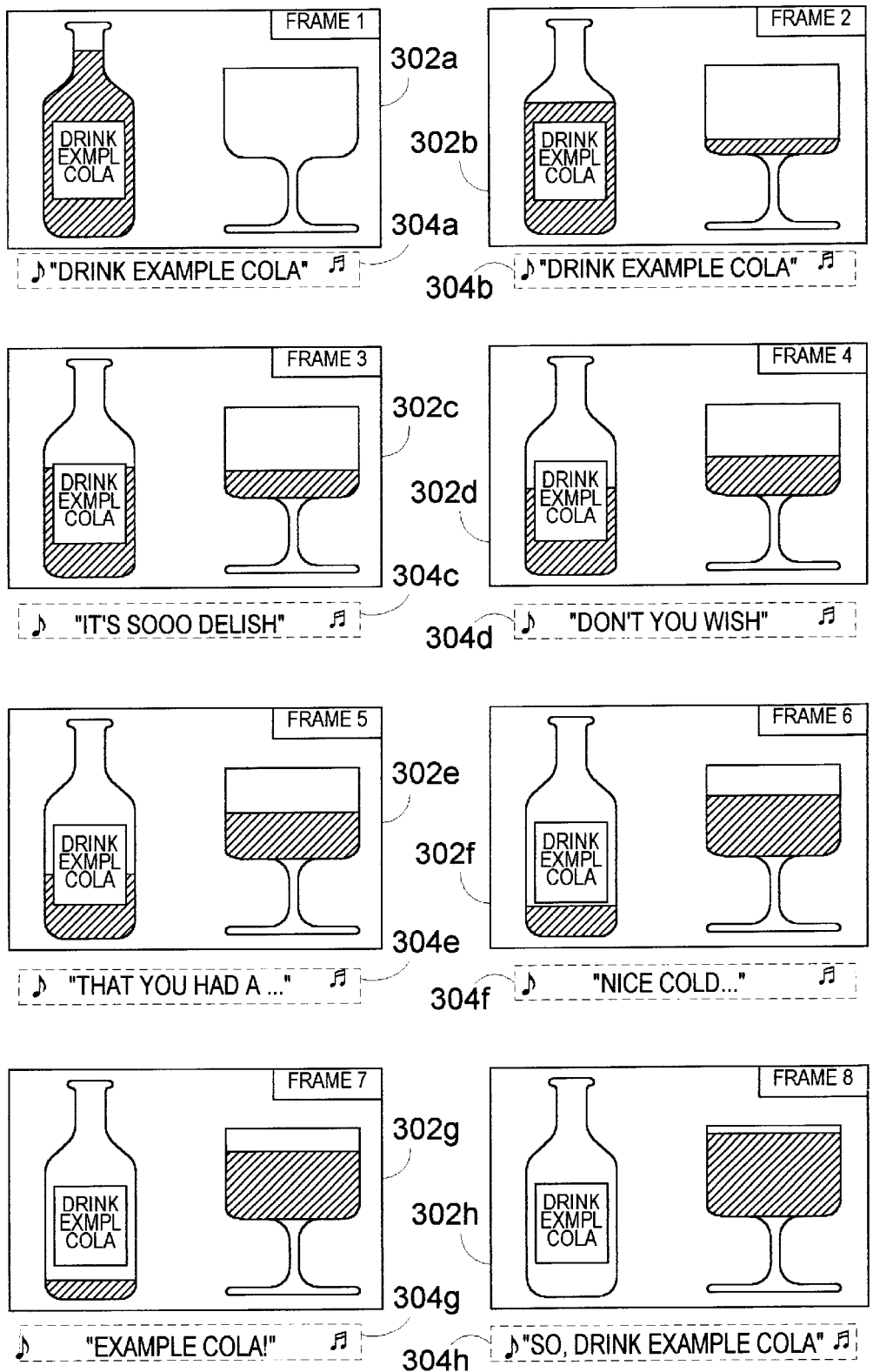
FIG. 3 is a schematic diagram showing a third example of a sequence of images.

As shown in FIG. 3, a plurality of sounds 304a–h could be output by the computer in combination with the images 302a–h. The sounds could be generated from a digitized copy of, for example, an advertising jingle. In this example, the amount of time passing and the amount of time remaining in the wait period could be indicated by the image 302a–h, the plurality of sounds 304a–h, or both.

Figure 4:
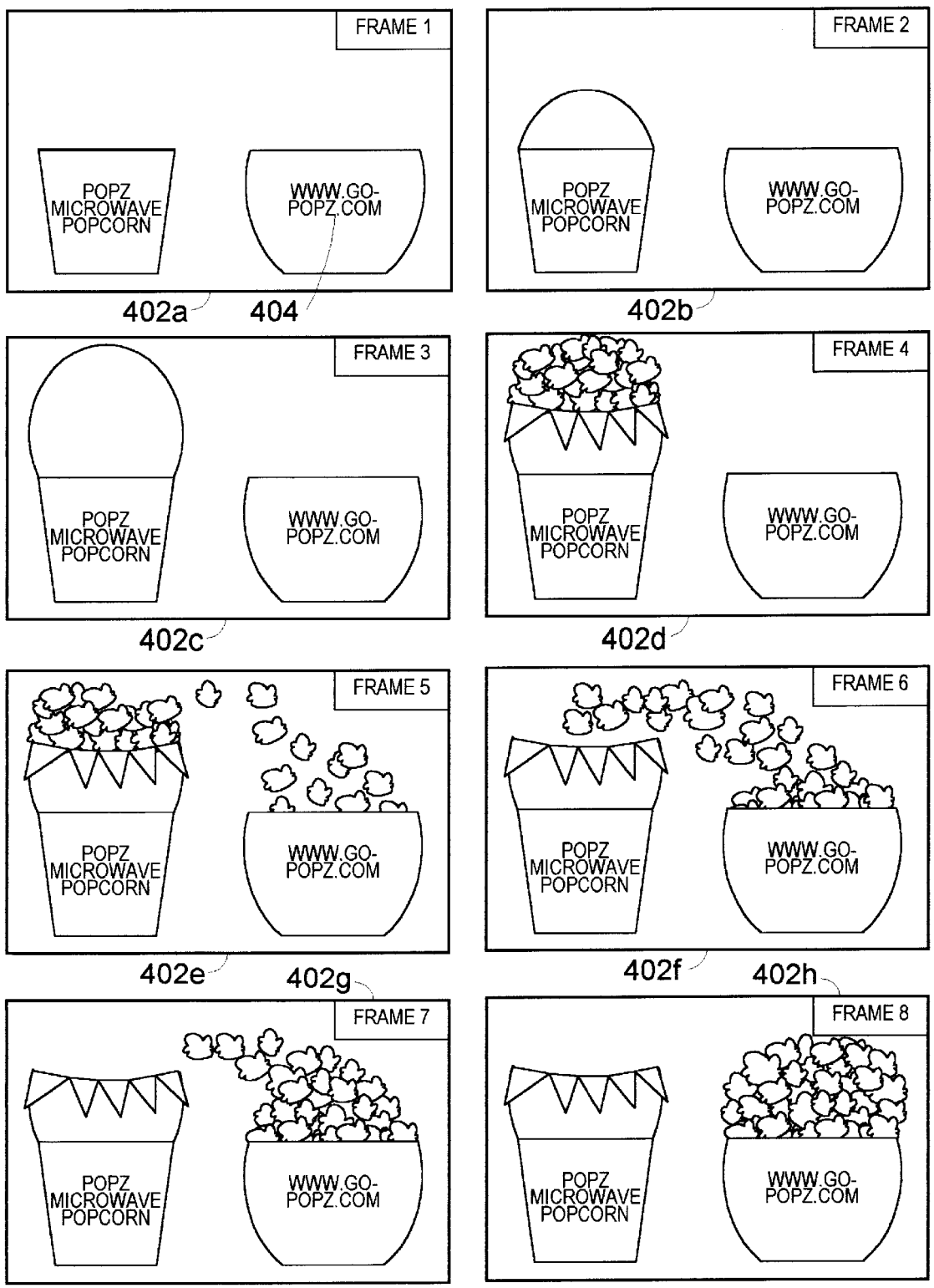
FIG. 4 is a schematic diagram showing a fourth example of a sequence of images.

As shown in FIG. 4, the plurality of images 402a–h could be provided with information such as a global computer network address 404 to the advertiser's network site. Such an address 404 could be in the form of static text, or it could be in the form of a hypertext link.

Figure 5:
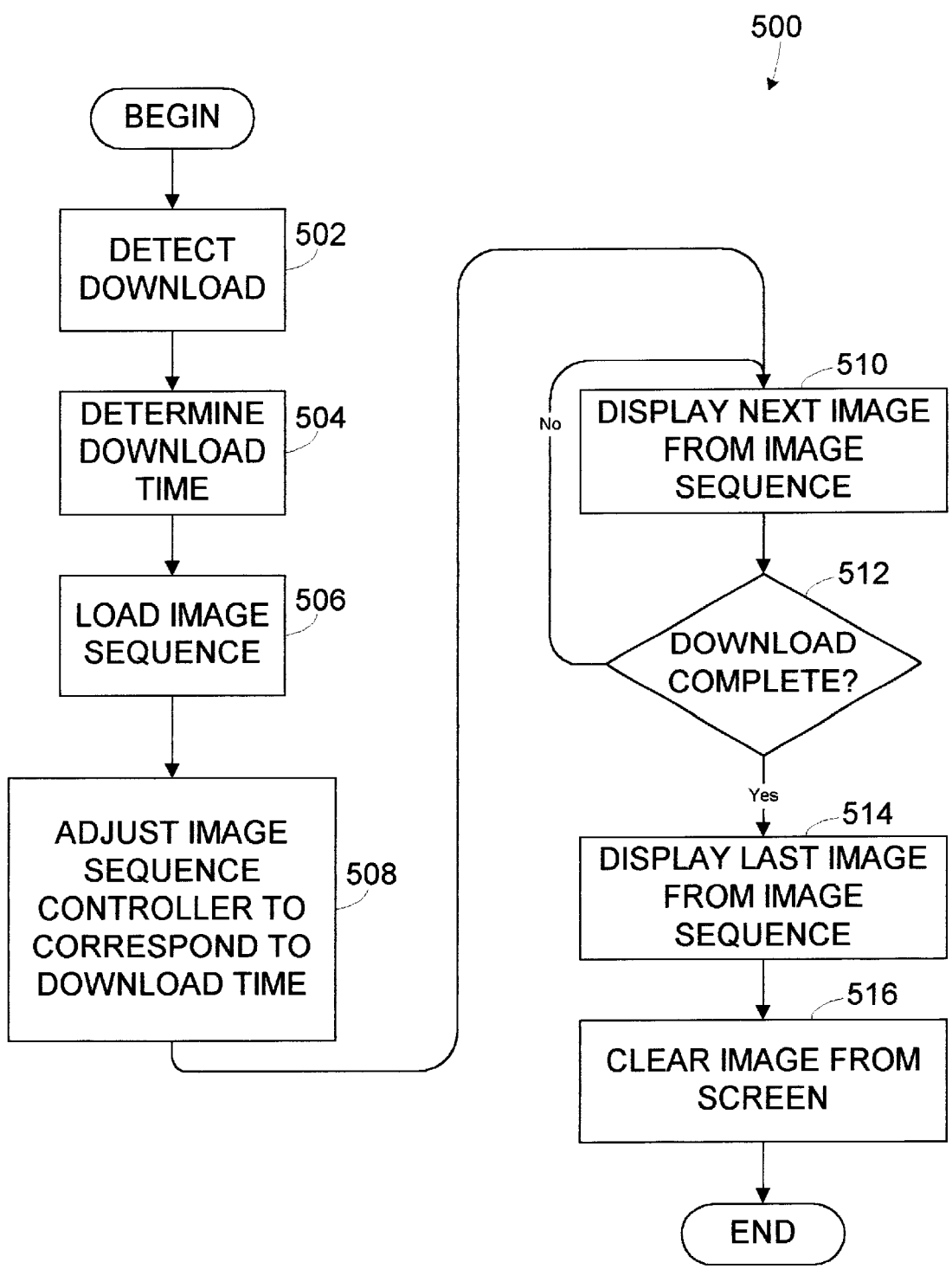
FIG. 5 is a flow chart showing the general sequence of steps executed in one embodiment of the invention.

As shown in FIG. 5, the steps 500 executed by the computer to display the images during the wait period begin when a wait period, such as a data download, is detected 502. The method of detection depends on the protocol for the type of wait period commencing (e.g., a global computer network download) and the method of detection is generally known in the art for each type of protocol. The computer determines 504 the amount of time that will be required to complete the wait period and then loads 506 a sequence of images stored in memory. Again, the method required for this determination depends on the protocol of the system causing the wait period and is generally known to the art for each protocol. In one embodiment, an image sequence controller, of the type that is typical for computer-generated video, is adjusted 508 so that the images of the animation are evenly displayed during the wait period. In another embodiment, images are sequenced at a fixed rate, with the final image remaining on the screen until the end of the wait period.

At this point, the computer displays 510 the first image in the image sequence and then performs a test 512 to determine if the wait period (e.g., download) is complete. If the answer to test 512 is "No," then execution returns to display 510 the next image from the image sequence. If the answer to test 512 is "Yes," then the computer displays 514 the last image from the sequence and then clears 516 the image from the screen, allowing normal use of the computer thereafter.

Figure 6:
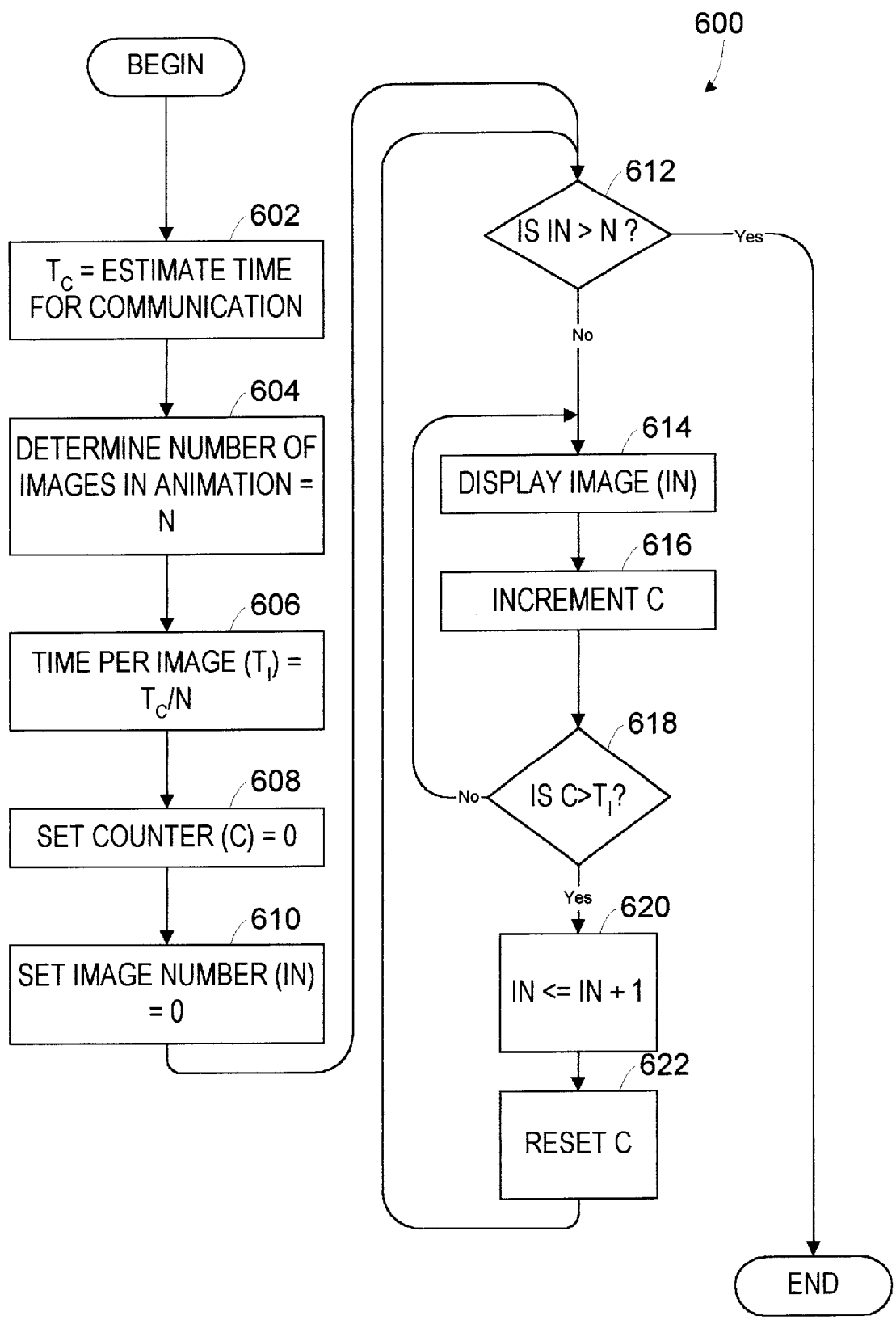
FIG. 6 is a flow chart showing one method of synchronizing an animation with a wait period in accordance with the invention.

As shown in FIG. 6, one embodiment of the steps performed by the image sequence controller 600 starts by setting a variable, $T_c$, equal to an estimate of the amount of time required for the wait period. Typically, this estimate is included in most computer communication protocols, or it may easily be determined therefrom, as is generally known in the art. The computer sets 604 a variable, N, equal to the number of images in the animation (which could be stored in a memory location with the image data for each animation) and determines 606 the amount of time that each image should be displayed, $T_i$, as being equal to $T_c$ divided by N. The system then sets 608 a counter, C, equal to zero and sets 610 an image number variable, IN, equal to zero. The system performs a test 612 to determine if the image number IN is greater than the total number of images. If the answer to this test 612 is "Yes" then no images remain in the sequence to be displayed and execution exits this routine. On the other hand, if the answer to this test 612 is "No," then the system displays 614 the image having an image number corresponding to the current value of IN and the system increments 616 the counter C. Next, the system determines 618 if the value in the counter is greater that the time per image, $T_i$. If the answer to this test 618 is "No," then the current image should continue to be displayed and execution returns to the display current image operation 614. If the answer to test 618 is "Yes," then the current image has been displayed long enough, the image number IN is incremented 620, the counter is reset 622 and execution returns to test 612 to determine if the last image has been displayed.

Although the images disclosed above represent items, the images could also symbolically represent or otherwise relate to a product. For example, if one were advertising milk, the animation could include representations of a cow, or even a company logo. Furthermore, text or symbols could be used to represent the product being advertised. The invention could also be applied to the advertising of a service by showing a representation of actions relating to the service (e.g., a delivery service could show images of a delivery truck going from a starting point to an ending point).

The system could employ several different animations and could be caused to show a different animation during each successive wait period, so that the same animation is not shown twice in a row. This approach offers the advantage of reducing the likelihood that the user will become bored with the animations after several successive wait periods.

The figures referred to herein include examples of embodiments of the invention that contain depictions that may resemble trademarks or trade names. It is the intention of the inventor that such depictions represent only the idea of such an identifier being used in association with the embodiment, and that such depictions do not resemble any actual trademarks or trade names. Any resemblance of any of the depictions in the figures to any actual trademark or trade name is completely unintentional and merely coincidental. Therefore, none of the depictions in the figures should be interpreted as showing any affiliation with any actual source of goods or services.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method of displaying advertising and communicating computer operation during a wait period, comprising the step of during a wait period, having a beginning and an end, displaying in a predetermined sequence a plurality of images directed toward advertising information, having a first image and a last image, as part of an animation, so that display of the first image coincides with the beginning of the wait period and so that display of the last image coincides with the end of the wait period.

2. The method of claim 1, wherein the animation relates to a product that is being advertised.

3. The method of claim 1, wherein the animation relates to a product that is being advertised.

4. The method of claim 1, further comprising the step of providing text that indicates the amount of time remaining in the period of time at any given time during the wait period.

5. A method of displaying advertising and communicating computer operation during a wait period, comprising the steps of a. determining a period of time, having a beginning and an end, that is required to complete a wait period; and b. during the wait period, displaying in a predetermined sequence a plurality of images directed toward advertising information, including a first image and a last image, as part of an animation, the first image being displayed contemporaneously with the beginning of the period of time an d the last image being displayed contemporaneously with the end of the period of time.

6. The method of claim 5, wherein the animation relates to a product that is being advertised.

7. The method of claim 5, wherein the animation relates to a service that is being advertised.

8. The method of claim 5, further comprising the step of providing text that indicates the amount of time remaining in the period of time at any given time during the wait period.

9. A method of advertising and communicating computer operation during a wait period, comprising the steps of:

a. determining a period of time, having a beginning and an end, that is required to complete a wait period; and b. during the wait period, outputting in a predetermined sequence a plurality of sounds, including a first sound and a last sound, as part of an audible message that includes advertising information therein, the first sound being output contemporaneously with the beginning of the period of time and the last sound being output contemporaneously with the end of the period of time.

* * * * *